(No Model.)
J. C. LOVE.
ELECTRICAL CONDUIT.
No. 463,197. Patented Nov. 17, 1891.
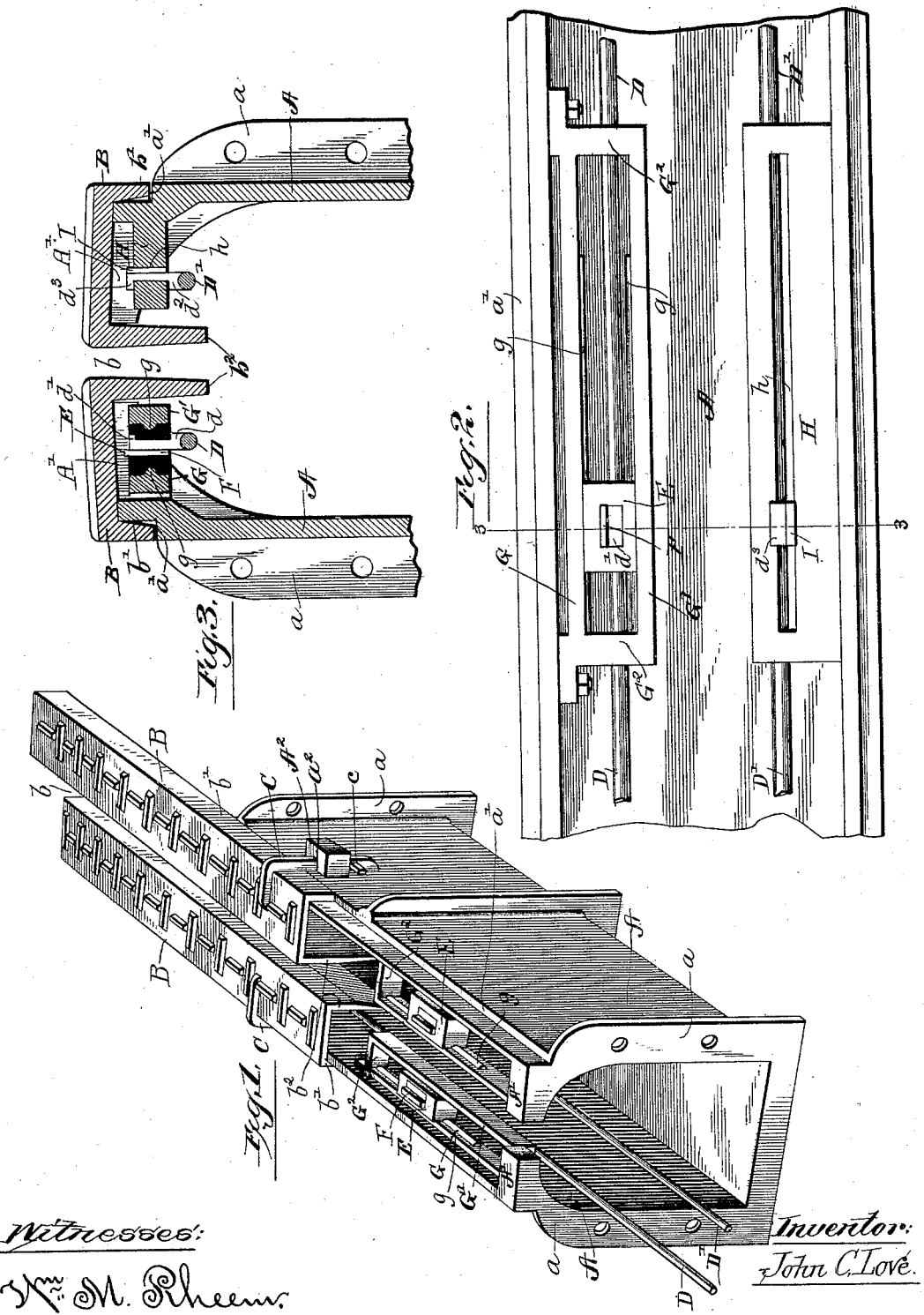
Witnesses:
Wm. M. Rheem.
E. P. Wardeman.
Inventor:
John C. Love.
By Dayton, Poole & Brown
Attys.

UNITED STATES PATENT OFFICE.

JOHN C. LOVE, OF PHILADELPHIA, PENNSYLVANIA, ASSIGNOR TO THE LOVE ELECTRIC TRACTION COMPANY, OF CHICAGO, ILLINOIS.

ELECTRICAL CONDUIT.

SPECIFICATION forming part of Letters Patent No. 463,197, dated November 17, 1891.

Application filed February 10, 1891. Serial No. 380,971. (No model.)

*To all whom it may concern:*

Be it known that I, JOHN C. LOVE, of Philadelphia, in the county of Philadelphia and State of Pennsylvania, have invented certain new and useful Improvements in Electrical Conduits; and I do hereby declare that the following is a full, clear, and exact description thereof, reference being had to the accompanying drawings, and to the letters of reference marked thereon, which form a part of this specification.

This invention relates to improvements in underground conduits for electric conductors and to means for supporting the conductors within such conduits; and it consists in the matters hereinafter described, and set forth in the appended claims.

The invention is more especially designed for use in connection with electric railways; but some of the improvements herein described may be applied to other uses.

In the accompanying drawings, Figure 1 is a perspective view showing a conduit-section embodying my invention. Fig. 2 is a plan view of a part of the conduit-section with the top plates or slot-rails removed. Fig. 3 is a cross-section of the same, taken upon line 3 3 of Fig. 2.

A conduit embodying my invention consists, as shown in the accompanying drawings, of a plurality of trough-shaped sections A A, which are secured together end to end and which have open tops closed by means of flanged bars or slot-rails B B, which rest upon and form the top of the conduit and which are set at a proper distance apart to form a central slot $b$ between them for the passage of the traveling contact-making devices attached to the cars of the railway.

The conduit-sections A A are of U shape in cross-sectional form, and are provided at suitable intervals with external transverse stiffening ribs or flanges $a$ $a$, of which those at the ends of the section are flush with the end surfaces thereof, and are provided with bolt-holes to receive bolts for holding the flanges in contact with the similar flanges of adjacent sections, and thereby securing the sections together. Attached to the inner surface of the side walls of the conduit at the top of the same are inwardly-extending rigid arms or brackets A' A', the top surfaces of which are flush with the upper edges of said side walls and which are preferably, but not necessarily, cast integral with said side walls.

The slot-rails B B are provided with external depending flanges $b'$ $b'$, which extend over the upper margin of the side walls of the conduit when said slot-rails are in place upon the conduit, and said slot-rails are also provided at their inner or adjacent edges with depending flanges $b^2$ $b^2$, which are preferably made considerably deeper than the external flanges $b'$ $b'$.

Preferably the side walls of the conduit are provided with external recesses or rabbets $a'$ $a'$ to receive the flanges $b'$ $b'$ of the slot-rails, so that the side edges of the slot-rails are flush with the sides of the conduit when the rails are in place upon the conduit; but this construction is not essential, and the said recesses or rabbets may be omitted with practically the same result. The arms or brackets A' A' serve to rigidly support the inner parts or adjacent edges of the slot-rails and are placed at suitable distances apart to afford the necessary support for the said slot-rails. Commonly, however, when the conduit-sections are made of relatively short lengths, as shown in the drawings, the said arms or brackets will be located at the ends of the sections only. The inner or free ends of the said arms or brackets are adapted to engage the inner surfaces of the depending flanges $b^2$ $b^2$ when the slot-rails are in proper position upon the conduit, so that said brackets prevent the rails from being moved or shifted outwardly, while at the same time the engagement of the depending exterior flanges $b'$ $b'$ of the slot-rails with the outer surface of the conduit-walls prevents the slot-rails from being moved or shifted inwardly. The construction described therefore insures the holding of the slot-rails from lateral displacement under shocks and blows which are likely to come upon them by the impact of wheels of vehicles and otherwise. The overlapping of the external flanges $b'$ $b'$ upon the upper margins of the side walls of the conduit furthermore tends to deflect surface-water to the outside of the conduit instead of permitting it to easily enter the same.

The deep inner depending flanges $b^2\ b^2$ obviously serve to give strength and rigidity to the inner edges of the slot-rails, so that said inner edges will be rigidly and strongly supported in their parts between the brackets $A'$ $A'$. By the presence of said deep flanges, therefore, the said brackets may be located at a considerable distance apart, while at the same time providing the necessary unyielding support for the inner edges of the slot-rails.

As far as the features of the invention above described are concerned, any suitable means may be employed for securing the slot-rails from being lifted from their place upon the conduit; but, as a further and separate improvement, I have provided a construction for this purpose as follows:

$A^2$ is a lug or projection cast upon the external surface of the conduit near the top of the side wall thereof and provided with a vertical opening $a^2$.

C is a metal bar adapted for insertion through the lug $A^2$ and made hook-shaped upon its upper end and provided with a laterally-projecting arm or head adapted to engage the slot-rails. A wedge $c$ is inserted through a suitable opening in the bar C below the lug $A^2$, and by tightening said wedge the bar may be drawn firmly down against the slot-rail and the latter thereby held from displacement.

Fastening devices of the character described are located at suitable intervals along the conduit, so as to hold the slot-rails properly in place. Said slot-rails are shown as provided with lugs or projections on their upper surfaces to give proper foothold for horses, and the lugs or projections on the upper ends of the fastening-bars C are conveniently arranged to enter between adjacent lugs in the manner shown, so as to avoid the possibility of bending of the said holding-bars C.

D D' are electric conductors located within the conduit. As shown in Fig. 1, said conductors are both insulated; but in Figs. 2 and 3 one D is insulated, while the other D' is in metallic connection with the conduit. Both conductors in Fig. 1 and the conductor D in Figs. 2 and 3 are supported within the conduit by means of insulating connections arranged at intervals and each of which embraces a tongue $d$, which is soldered or brazed or otherwise secured to the conductor and passes through a vertically-apertured insulating-block E, sustained in the upper part of the conduit beneath the slot-rail, the said tongue being provided at its upper end with a lateral hook or projection $d'$, which engages with the upper edge of one side of the block, Fig. 3, and is held in engagement therewith by means of a key F, inserted in the opening of the block at one side of the tongue. The said insulating-block E is held in position upon the conduit by means of two parallel longitudinally-arranged bars G G', which are provided on their inner faces with ribs $g\ g$, engaging grooves or notches in the opposite sides of the said block. The external bars G and G' may be cast upon the wall of the conduit; but preferably bars are cast in one piece with two arms or cross-bars $G^2\ G^2$, which are bolted to the wall of the conduit, as shown. The ribs $g\ g$, which engage the notches or grooves in the insulating-blocks E, terminate at a distance from one of the cross-pieces $G^2$, equal to or somewhat greater than the length of the insulating-block, so that when the block is slipped along endwise until free from the said ribs it may be entirely disengaged from the conduit.

As far as above described, the device for supporting and insulating the conductor is constructed in the same manner as shown in prior Letters Patent No. 392,127, granted to me October 30, 1888. As shown in said patent, however, the ribs or flanges which engage the insulating-block are made no longer than the block itself, so that said block has no capacity for movement endwise, except in one direction and in a manner to disengage it from the said ribs or flanges by which it is supported in place. As a separate and further improvement, I make the said ribs or flanges considerably longer than the block, thereby enabling the block to be moved bodily endwise of the conduit a considerable distance in either direction without liability of disengaging it from the said supporting ribs or flanges. This construction is of great advantage, for the reason that it enables the tongues attached to the conductor, together with the insulating-blocks in which the said tongues are secured, to move bodily a short distance in either direction when making taut the conductor after it has been placed within the conduit and the tongues thereon have been engaged with the insulating-blocks. This construction is of great advantage, furthermore, for the reason that it renders unnecessary great accuracy in the placing of the tongues upon the conductors, it being obvious that if the insulating-blocks were not movable endwise of the conduit great care would be required to insure the placing of the tongues in position to exactly correspond with the location of the insulating-blocks, and any error in the placing of the tongues would prevent the conductor being drawn taut when placed within the conduit.

The bars G G', which sustain the insulating-block in the manner hereinbefore described, are, as shown in the drawings, sustained from the side wall of the conduit in such manner that an opening or air-space is left between the bar which is nearest the said side wall and the said side wall, the said bars G G' being connected with the side walls solely by the transverse end pieces or brackets $G^2\ G^2$, hereinbefore referred to. By this construction a more perfect insulation is secured, for the reason that any water which may enter at the side of the conduit will flow down the side wall past the inner bar G, and there will thus be no possibility of water reaching the insulating-block.

Of the two conductors D D' illustrated, one D is insulated from the conduit in the manner above described, while the other D' is uninsulated, this conductor forming the return-conductor of the system. As a means of supporting the said conductor D', the latter is provided with tongues $d^2$, secured thereto at proper intervals, and each tongue is adapted to be inserted through a longitudinal slot $h$, formed in a horizontal support or projection H, cast upon or attached to the inner wall of the conduit near the upper part thereof. The tongue $d^2$ is provided with a hook or projection $d^3$ at its upper end, and is held in engagement with the support H by means of a key I in the same manner that the tongue $d$ is held in engagement with the insulating-block E. By providing a longitudinal slot $h$ for engagement with the tongue $d^2$ in the manner described, provision is made for endwise movement of the said tongue at the time of inserting and stretching the conductor D', it being obvious that after said conductor has been inserted and drawn taut the keys I may be tightened to secure the tongues in any position at any point in the groove $h$ at which they may happen to be located. It will of course be understood that the keys will not be tightened, but will either be left out entirely or inserted loosely until the conductor has been stretched taut and the several tongues have been brought to the positions in the slots which they will finally occupy.

I claim as my invention—

1. The combination, with the side walls of a conduit provided with rigid inwardly-extending brackets, of slot-rails provided with depending flanges on both margins and adapted to extend over the upper edges of the said side walls, with their outer flanges engaging the outer surfaces of the side walls and their inner flanges engaging the said brackets, substantially as described.

2. The combination, with an electric conductor and a stationary support therefor, of a tongue attached to the conductor and having longitudinally-sliding connection with said support, substantially as described.

3. The combination, with an electric conductor and a stationary support therefor, of an insulating-block attached to the conductor and having longitudinally-sliding connection with said support, substantially as described.

4. The combination, with an electric conductor and a stationary support therefor, of an insulating-block having longitudinally-sliding connection with the support, and a tongue attached to the conductor and secured in said insulating-block, substantially as described.

5. The combination, with an electric conductor and a stationary support therefor provided with parallel bars having opposite flanges or ribs, of an insulating-block having grooves or notches to engage said flanges or ribs, and a tongue upon the conductor, attached to the said insulating-block, the said ribs or flanges being made longer than the insulating-block to afford longitudinal movement in the latter, substantially as described.

6. The combination, with the side walls of a conduit and slot-rails resting upon the top of the side walls thereof, of locking devices consisting of apertured lugs or projections upon the outer surfaces of the side walls, locking-bars engaged with the slot-rails at their upper ends, and wedges for holding the bars in place, substantially as described.

7. The combination, with the side walls of an electric conduit and a conductor therein, of a support for the conductor, attached to the said side wall of the conduit and consisting of an insulating-block supporting the conductor, and parallel bars which sustain the block and which are separated from the said side wall of the conduit by an air-space, substantially as described.

In testimony that I claim the foregoing as my invention I affix my signature in presence of two witnesses.

JOHN C. LOVE.

Witnesses:
C. CLARENCE POOLE,
GEORGE W. HIGGINS, Jr.